Sept. 20, 1927.
B. T. BARBER
1,643,235
WINDSHIELD CLEANER
Filed April 13, 1927
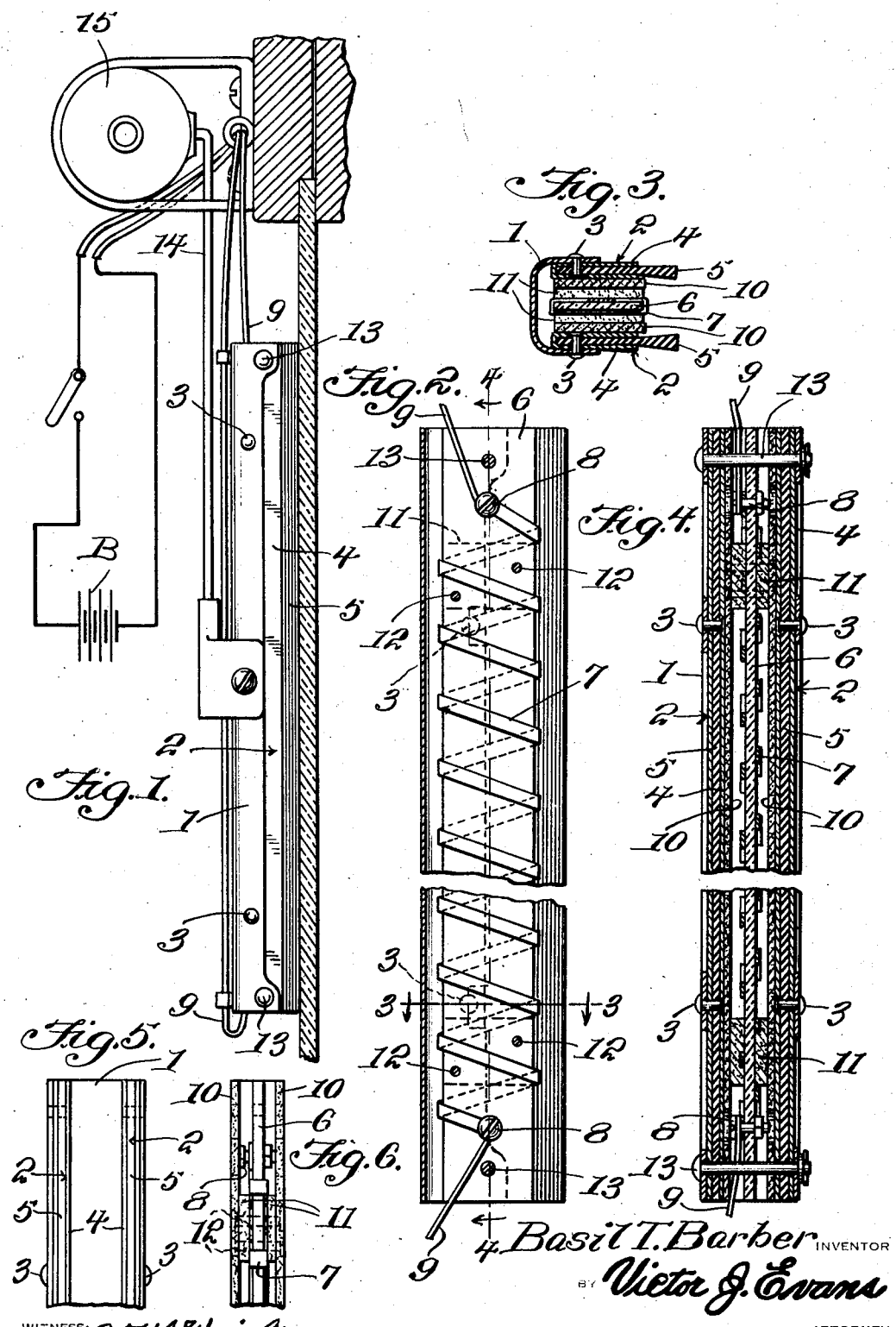
Basil T. Barber INVENTOR
BY Victor J. Evans
ATTORNEY
WITNESS:

Patented Sept. 20, 1927.

1,643,235

UNITED STATES PATENT OFFICE.

BASIL T. BARBER, OF IOLA, KANSAS.

WINDSHIELD CLEANER.

Application filed April 13, 1927. Serial No. 183,515.

This invention relates to a wiper for windshields and the like, the general object of the invention being to associate heating means with the wiper so that ice and the like will be prevented from accumulating on that part of the windshield which is being engaged by the wiper.

Another object of the invention is to so form the device that a chamber is provided in which the heating element is located and which acts to direct the heat upon the glass of the windshield, the walls of this chamber terminating in wiper elements so that the heat is projected against the windshield between the wiper elements.

A still further object of the invention is to so arrange the parts that the heating unit may be easily removed from the device whenever desired.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through a windshield, showing the invention in use.

Figure 2 is a longitudinal sectional view through the device.

Figure 3 is a section on line 3—3 of Figure 2.

Figure 4 is a section on line 4—4 of Figure 2.

Figure 5 is a fragmentary view of the casing formed by the cover member and the two wiper elements, with the heating unit removed.

Figure 6 is a fragmentary view of the heating unit.

In these views, 1 indicates a channel shaped member which is formed of any suitable material and 2 indicates the wiper elements, one of which is attached to each flange or limb of the member 1 by the rivets or bolts 3. Each wiper element consists of a U-shaped strip 4 of metal and a strip 5 of rubber or the like fastened in the strip 2 and having a portion projecting therefrom to engage the glass of the windshield. Thus the channel shaped member 1 and the wiper elements 2 form a chamber which opens out between the projecting portions of the wiper strips 5.

The heating unit comprises a strip 6 of non-conducting material and a coil 7 formed from a flat strip of conducting material which is wound around the strip 6 and has its ends fastened thereto by the screws 8. These screws also hold the conductors 9 to the ends of the coil 7 and these conductors are connected to a battery B which may be the battery of the motor vehicle. The heating unit further comprises the two strips 10 of non-conducting material placed one on each side of the strip 6 and held in spaced relation thereto by the spacers 11 which are also of non-conducting material. These strips 10 and the spacers 11 are preferably of mica, asbestos or the like. The strips 6 and 10 and the spacers 11 are held together by the rivets 12 or other fastening means. This unit is adapted to be placed in the chamber formed by the members 1 and 2, as shown in Figure 3, and the heating unit is detachably held in the chamber by means of the bolts 13 which pass through the end portions of the member 1, through the wiper members 2 and through the heating unit, as shown in Figure 4.

Thus it will be seen that when current is flowing through the coil 7, the heat generated will accumulate in the chamber and will be directed against the glass which is being engaged by the wiper strips 5 so that ice will be prevented from accumulating on the glass and the cleaning effect of the wiper strips will be facilitated by this heat.

The device can be manipulated in any desired manner, though Figure 1 shows it as having an arm 14 attached thereto, said arm being operated through means of a motor 15 which may be of any desired type. Of course, the device can be operated by hand if desired.

It will also be seen that the heating unit can be removed from the other parts by taking out the bolts 13, so that the unit can be repaired or a new one substituted therefor or so that the wiper part can be used without the heating attachment.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a channel-shaped member, a wiper element fastened to each flange of said member, a heating unit detachably arranged in the space formed by said member and wiper elements, said unit consisting of a strip of non-conducting material, a heating coil carried by the same, a pair of strips formed of non-conducting material arranged one on each side of the first mentioned strip and spaced therefrom and means for supplying current to the heating coil.

In testimony whereof I affix my signature.

BASIL T. BARBER.